United States Patent
Jeong et al.

(10) Patent No.: US 9,568,490 B2
(45) Date of Patent: Feb. 14, 2017

(54) ANGULAR VELOCITY SENSOR

(75) Inventors: Heewon Jeong, Tokyo (JP); Masahide Hayashi, Hitachinaka (JP); Kiyoko Yamanaka, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 251 days.

(21) Appl. No.: 14/383,335

(22) PCT Filed: Mar. 19, 2012

(86) PCT No.: PCT/JP2012/056978
§ 371 (c)(1),
(2), (4) Date: Dec. 12, 2014

(87) PCT Pub. No.: WO2013/140488
PCT Pub. Date: Sep. 26, 2013

(65) Prior Publication Data
US 2015/0096373 A1    Apr. 9, 2015

(51) Int. Cl.
*G01C 19/00* (2013.01)
*G01C 19/02* (2006.01)
*G01C 19/5726* (2012.01)
*G01C 19/5762* (2012.01)
*G01C 19/5719* (2012.01)

(52) U.S. Cl.
CPC ............ *G01P 9/02* (2013.01); *G01C 19/5719* (2013.01); *G01C 19/5726* (2013.01); *G01C 19/5762* (2013.01)

(58) Field of Classification Search
CPC ... G01P 9/02; G01C 19/5719; G01C 19/5726; G01C 19/5762
See application file for complete search history.

(56) References Cited

U.S. PATENT DOCUMENTS

| | | | | |
|---|---|---|---|---|
| 5,911,156 A | * | 6/1999 | Ward | G01C 19/5719 73/504.16 |
| 6,338,199 B1 | | 1/2002 | Chigira et al. | |
| 6,666,091 B2 | * | 12/2003 | Hatanaka | G01C 19/5607 73/504.16 |
| 6,705,151 B2 | * | 3/2004 | Nozoe | G01P 21/02 73/1.37 |

(Continued)

FOREIGN PATENT DOCUMENTS

DE    10 2004 014 915 A1    10/2004
JP        7-19878 A         1/1995

(Continued)

OTHER PUBLICATIONS

International Search Report dated May 1, 2012 (Two (2) pages).
German-language Office Action issued in counterpart German Application No. 11 2012 006 056.3 dated Mar. 2, 2016 with English translation (10 pages).

(Continued)

*Primary Examiner* — Laura Martin
*Assistant Examiner* — Samir M Shah
(74) *Attorney, Agent, or Firm* — Crowell & Moring LLP

(57) ABSTRACT

Provided is an angular velocity sensor including a plurality of angular velocity detection units each outputting a different detection result, and including a common driving circuit to drive the angular velocity detection units. The angular velocity detection units of the angular velocity sensor of the present invention are configured to have different driving amplitudes when being driven by a driving signal at the same frequency.

9 Claims, 14 Drawing Sheets

(56) References Cited

U.S. PATENT DOCUMENTS

| | | | |
|---|---|---|---|
| 6,993,969 B2* | 2/2006 | Higuchi | G01C 19/5719 |
| | | | 73/504.12 |
| 7,383,729 B2* | 6/2008 | Weber | G01C 19/5719 |
| | | | 73/504.12 |
| 9,291,455 B2* | 3/2016 | Classen | G01C 19/5719 |
| 2003/0024312 A1 | 2/2003 | Babala | |
| 2004/0231419 A1 | 11/2004 | Higuchi | |
| 2008/0098814 A1 | 5/2008 | Platt et al. | |
| 2009/0314084 A1 | 12/2009 | Sugibayashi et al. | |
| 2010/0050768 A1* | 3/2010 | Takeyama | G01C 19/5607 |
| | | | 73/504.16 |
| 2010/0313657 A1* | 12/2010 | Trusov | G01C 19/5747 |
| | | | 73/504.16 |
| 2012/0111120 A1* | 5/2012 | Brand | G01C 19/5719 |
| | | | 73/662 |

FOREIGN PATENT DOCUMENTS

| | | |
|---|---|---|
| JP | 9-210691 A | 8/1997 |
| JP | 10-267664 A | 10/1998 |
| JP | 11-230759 A | 8/1999 |
| JP | 2004-309476 A | 11/2004 |
| JP | 2005-500540 A | 1/2005 |
| JP | 2006-267094 A | 10/2006 |
| JP | 2008-134243 A | 6/2008 |
| JP | 2010-2361 A | 1/2010 |

OTHER PUBLICATIONS

Japanese Office Action dated Jun. 23, 2015, with English translation (Five (5) pages).

* cited by examiner

ANGULAR VELOCITY SENSOR

TECHNICAL FIELD

The present invention relates to angular velocity sensors.

BACKGROUND ART

Known angular velocity sensors (gyro) include: mechanical type sensors that use the precession of a rotating body; optical type sensors that use a change in timing to receive laser beams revolving in a rotating enclosure; and fluid type sensors that spray a sensing gas to a heated wire in an enclosure and detect variations of the amount of sprayed gas with the rotation of the enclosure via the temperature of the wire, for example.

Recently, there is a growing demand for angular velocity sensors in car navigation systems, vehicle's antiskid brake systems, and other systems to detect the orientation of a vehicle. Compared with the aforementioned types of sensors, inexpensive, light-weighted and compact vibration type angular velocity sensors are becoming a mainstream. The vibration type angular velocity sensors are configured to, when an angular velocity is exerted on an oscillator vibrating in a predetermined reference direction, detect a new vibration component (hereinafter referred to as "angular velocity vibration component") based on a Coriolis force in a detecting direction orthogonal to the reference vibration direction, and output angular velocity information based on the detected vibration component. The following Patent Literature 1 describes a tuning-fork type angular velocity sensor as an exemplary configuration of the vibration type angular velocity sensor.

In the antiskid brake system of a vehicle, a value (command value) of a steering angle sensor installed in a steering wheel is compared with an output value (measured value) of an angular velocity sensor incorporated in the antiskid brake system to determine whether the vehicle is skidding. Based on the determination result, the engine output and braking forces of the four wheels are controlled so as to stop skidding of the vehicle body.

A rollover detection system of a vehicle determines whether the vehicle is rolled over or not based on an output value (measured value) of an angular velocity sensor built in the system, and inflates an airbag and further stops the feeding of fuel based on the result, thus preventing a secondary accident.

Each of these systems has to measure an angular velocity in a different detection direction. For instance, the antiskid brake system of a vehicle has to detect the rotation around an axis that is orthogonal to the ground. Meanwhile, the rollover detection system has to detect the rotation around an axis that is horizontal to the ground.

The detection range also may vary from one system to another. For instance, in the case of the antiskid brake system, relatively slow turn is a major control target, and the angular velocity sensor for this system has a relatively narrow detection range and high resolution. Whereas, since the rollover detection system aims to detect rollover caused by an accident, the angular velocity sensor for this system has a wider detection range and relatively low resolution. In this way, angular velocity sensors have to have a different detection direction, a detection range and resolution for each system.

The following Patent Literature 2 discloses the configuration including two angular velocity detection units having a revolving weight, in which an output signal from each angular velocity detection unit is calculated, thus detecting angular velocities and accelerations in two-axis directions. The following Patent Literature 3 discloses the configuration to perform calibration so that each of a plurality of angular velocity detection elements detects a change in angular velocity of a predetermined range.

CITATION LIST

Patent Literatures

Patent Literature 1: JP Patent Publication (Kokai) 2008-134243 A
Patent Literature 2: JP Patent Publication (Kokai) H10-267664 A (1998)
Patent Literature 3: JP Patent Publication (Kohyo) 2005-500540 A

SUMMARY OF INVENTION

Technical Problem

As described above, an angular velocity sensor included in the antiskid brake system and an angular velocity sensor included in the rollover detection system have different detection directions and detection ranges. This requires a different angular velocity sensor to be used for each system, resulting in increase of the total cost of the system. Other systems have a similar problem.

To realize both of a wide measurement range and high resolution, the dynamic range, which is defined as the ratio of the detection range and the resolution, has to be large. To achieve this, an angular velocity detection unit has to be processed precisely, and components such as resistances, capacitors and clocks making up a measurement circuit have to have high precision. This means that a sensor as a result would be at high cost.

Recently laws and regulations request vehicles to be provided with the antiskid brake system and the rollover detection system, and so the integration of angular velocity sensors in these systems into one would reduce the system cost.

A sensor disclosed in Patent Literature 1 is of a tuning-fork type, and so includes a plurality of angular velocity detection units, which, however, are to provide one detection result as a whole, and so cannot solve the above problem.

A sensor disclosed in Patent Literature 2 that calculates an output signal using a revolving weight to detect angular velocities in two directions is configured to output a single detection result, and so in order to deal with different detection ranges, individual sensors corresponding to the detection ranges have to be provided.

The configuration disclosed in Patent Literature 3 to perform calibration of output data is considered not to change the detection range of the sensor itself, but to just change an apparent figure by doubling the figure of the obtained detection result, for example. That is, this configuration has the same problem as stated above.

In view of the aforementioned problem, the present invention provides an angular velocity sensor including a plurality of angular velocity detection units each outputting a different detection result, and including a common driving circuit to drive the angular velocity detection units.

Solution to Problem

An angular velocity sensor according to the present invention includes a plurality of angular velocity detection units each having different driving amplitude when they are driven by a driving signal at the same frequency.

Advantageous Effects of Invention

The angular velocity sensor according to the present invention can provide a plurality of angular velocity detection results and can suppress the cost of the sensor.

DESCRIPTION OF EMBODIMENTS

In the embodiments described below, the invention will be described in a plurality of sections or embodiments as needed for a matter of convenience. However, these sections or embodiments are not irrelevant to each other unless otherwise stated, and the one relates to the entire or a part of the other as a modification example, details, or a supplementary explanation thereof.

In the embodiments described below, when referring to the number of elements (including number of pieces, values, amount, range, etc.), the number of the elements is not limited to a specific number unless otherwise stated or except in the case where the number is apparently limited to a specific number in principle. The number larger or smaller than the specified number is also applicable.

Furthermore, in the embodiments described below, the constituent elements (including element steps, etc.) are not always indispensable unless otherwise stated or except in the case where the components are apparently indispensable in principle.

Similarly, in the embodiments described below, when the shape of the constituent elements, the positional relation thereof and the like are mentioned, the substantially approximate and similar shapes and the like are included therein unless otherwise stated or except in the case where it is conceivable that they are apparently excluded in principle. The same goes for the numerical value and the range described above Components having the same function are denoted by the same reference symbols throughout the drawings to describe the embodiments, and the duplicate description thereof is omitted. Note that, in some drawings in the embodiments, hatching may be used even in a plan view for easy to see. The following describes embodiments of the present invention with reference to the drawings.

Embodiment 1

A vibration type angular velocity sensor (hereinafter, simply referred to as "angular velocity sensor") SA according to Embodiment 1 of the present invention will be described with reference to the drawings. The present embodiment 1 describes, as a specific application example, a multi-axis multi-range detection angular velocity sensor including a detection unit necessary to detect an angular velocity that is necessary for an antiskid brake system of a vehicle and a detection unit necessary to detect an angular velocity that is necessary for a rollover detection system of the vehicle which are integrated into one sensor.

Figure 15:
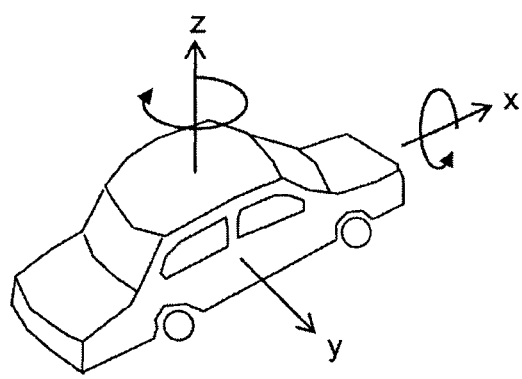
FIG. 15 is a plan view of a skid axis and a rollover axis of a vehicle.

FIG. 15 illustrates a skid axis and a rollover axis of a vehicle. The antiskid brake system requires information on the rotation around the axis (z-axis) that is orthogonal to the ground, and the rollover detection system requires information on the rotation around a travelling direction (x-axis) of the vehicle.

The angular velocity sensor that is used for the antiskid brake system is required to have a detection range of ±100 degrees/second and resolution of about 1 degree/second to detect the skidding of a vehicle and control outputs of the brake and the engine. Meanwhile, the angular velocity sensor that is used for the rollover detection system determines the rollover only, and so is required to measure a detection range of ±400 degrees/second and resolution of about 4 degrees/second that are wider than those of the antiskid brake system.

That is, the angular velocity sensor SA according to Embodiment 1 provides angular velocity information in two detection axes and of different detection ranges. These two angular velocity detection units are driven at the same driving frequency, whereby the driving circuit thereof can be shared, and the cost can be suppressed. The specific method therefor will be described later.

The following firstly describes the configuration of the angular velocity sensor SA and the method of manufacturing angular velocity detection units SA1 and SA2, and then describes the principle to drive the two angular velocity detection units SA1 and SA2 at the same driving frequency.

Embodiment 1

Configuration of Angular Velocity Sensor SA and its Manufacturing Method

Figure 1:
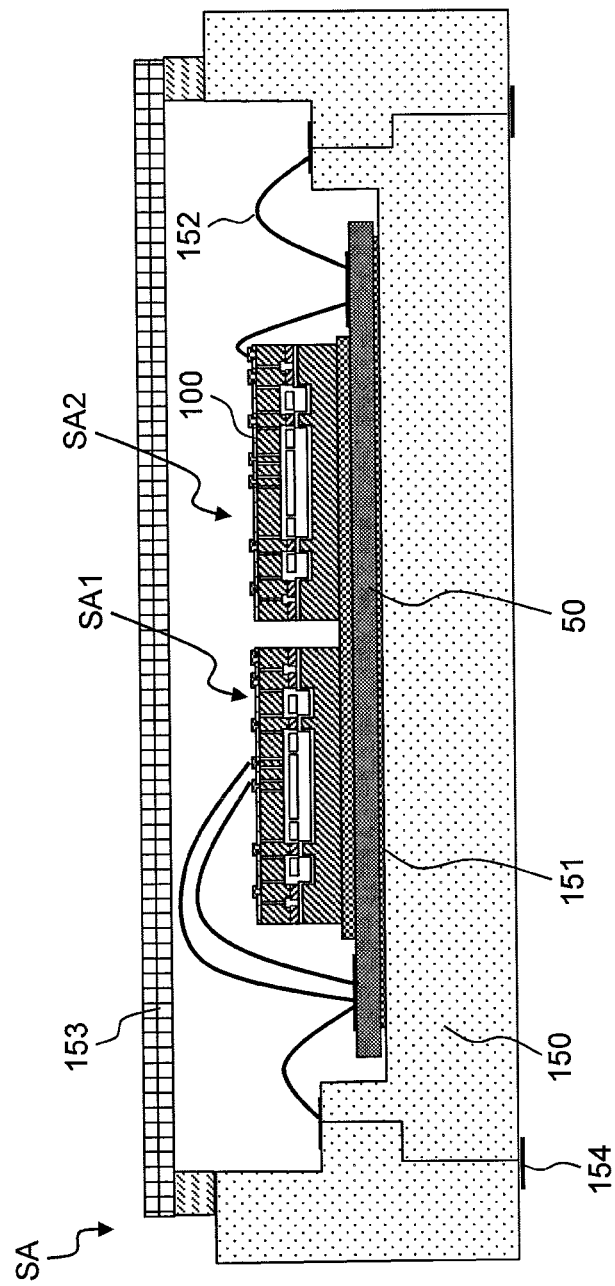
FIG. 1 is a sectional side view illustrating the configuration of an angular velocity sensor SA.

FIG. 1 is a sectional side view illustrating the configuration of the angular velocity sensor SA. The angular velocity sensor SA includes the angular velocity detection units SA1 and SA2. The angular velocity detection unit SA1 detects the skidding of the vehicle, and the angular velocity detection unit SA2 detects the rollover. These detection units are mounted in a ceramic package 150 with an IC 50 for signal processing.

After the IC 50 is secured at the ceramic package 150 via adhesive 151, the angular velocity detection units SA1 and SA2 are bonded on the IC 50 for securing. Then, the IC 50, the angular velocity detection units SA1 and SA2 and an external input/output terminal 154 of the ceramic package 150 are connected at therebetween via conductive wire 152. Finally, this is sealed with a lid 153, thus completing the angular velocity sensor SA.

Although not illustrated here, a package accommodating the contents such as the angular velocity detection units SA1 and SA2 and the IC 50 may be a plastic package or the like, instead of the ceramic package 150. That is, it may be any package as long as it can protect the contents such as the conductive wire 152 and enables input/output of signals from/to the outside.

Figure 2:
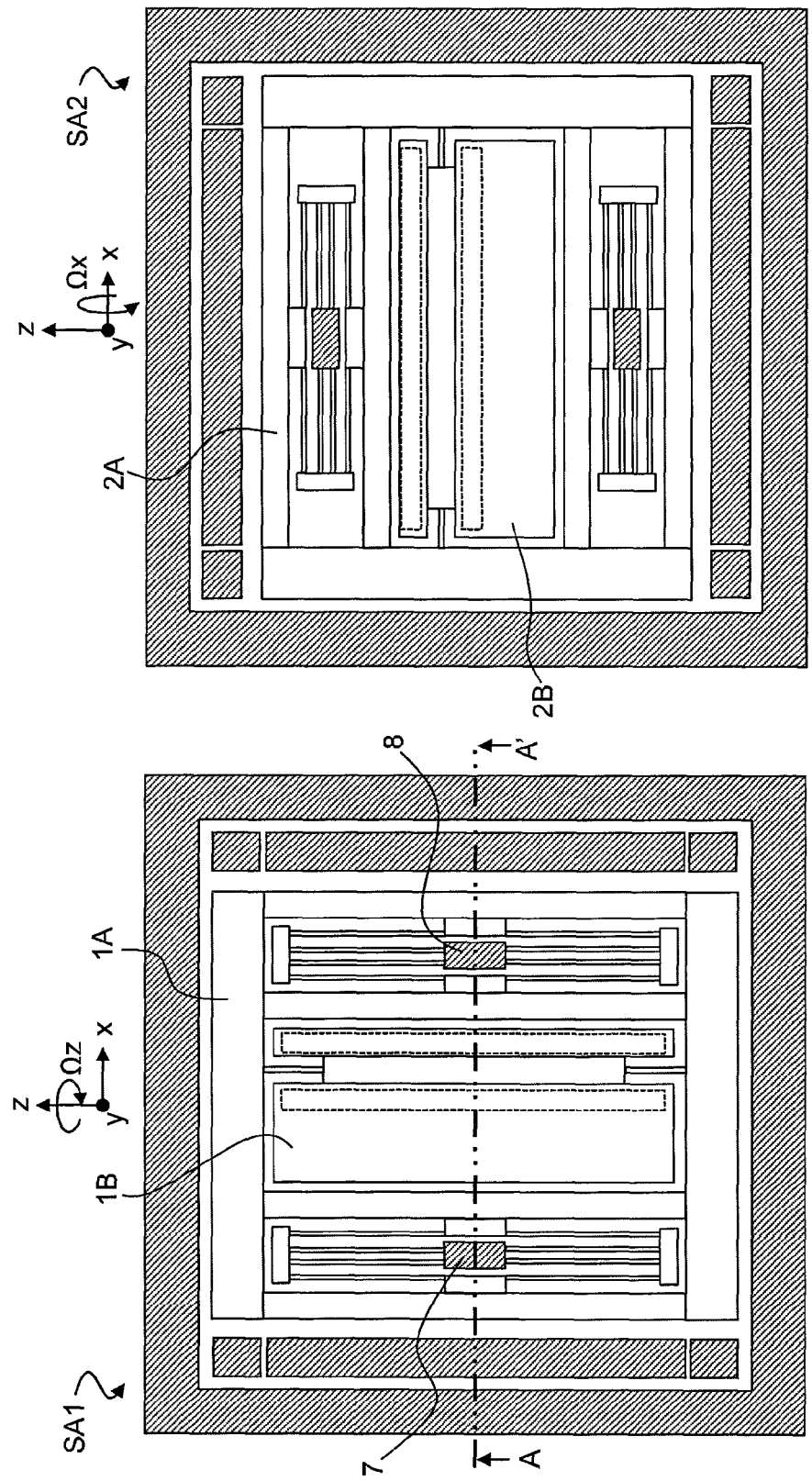
FIG. 2 is a plan view of angular velocity detection units SA1 and SA2.

FIG. 2 is a plan view of the angular velocity detection units SA1 and SA2. This drawing illustrates the state where a cap 100 described later is removed for the purpose of description. The details of each part will be described refereeing to FIG. 8 or later that is described below, and so reference numerals are assigned to major parts only in the drawing.

A movable part 1A is a part that is vibration-driven by a driving electrode. A movable part 1B is a movable part that is displaced with the generation of an angular velocity. Secured parts 7 and 8 are secured on a supporting substrate 3 described later. The angular velocity detection unit SA2 also has the same configuration, and reference numerals are assigned to movable parts 2A and 2B only thereof for the purpose of description. The angular velocity detection unit SA2, however, has a detection range and a detection direction that are different from those of the angular velocity detection unit SA1.

Figure 3:
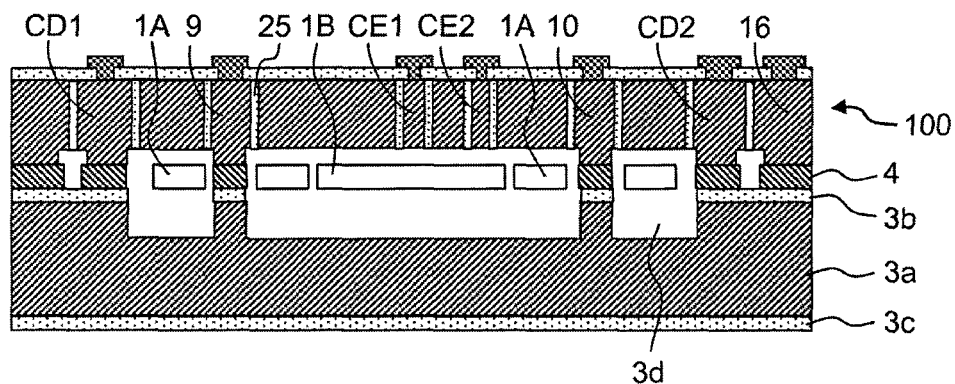
FIG. 3 is a cross-sectional view taken along A-A' of FIG. 2.

FIG. 3 is a cross-sectional view taken along A-A' of FIG. 2. The cap 100 has a function to protect the angular velocity detection units SA1 and SA2, and an electrode that joints with an external control circuit is formed in the cap 100. The supporting substrate 3 includes separate parts of a silicon substrate 3a, thermally-oxidized films 3b and 3c, and a space 3d. A device layer 4 is a layer, in which the moveable parts 1A and 1B are formed. Electrodes CD1 and CD2 are driving electrodes. Electrodes CE1 and CE2 are detection electrodes. Electrodes 9 and 10 are common electrodes. Reference numeral 16 denotes a dummy part. A groove 25 is formed to separate these parts.

Referring next of FIGS. 4 to 7, the following describes the method for manufacturing the angular velocity detection units SA1 and SA2 of the angular velocity sensor SA. Since the angular velocity detection units SA1 and SA2 can be manufactured by the same method, the following description mainly refers to the angular velocity detection unit SA1 only for the purpose of description.

Elements making up the angular velocity detection units SA1 and SA2 can be formed by semiconductor manufacturing techniques. A typical semiconductor manufacturing technique used to form the elements includes: a photolithography technique in which a light-sensitive or electron-beam sensitive resist is applied on a substrate, and then light such as ultraviolet light or an electron beam is applied so as to alter the property of the resist for removal, thus forming a minute pattern; a wet-etching technique in which an oxide film or a material such as silicon that is exposed at the opening of the resist formed by the photolithography technique is removed with hydrogen fluoride or alkaline chemicals such as TMAH or KOH; and a dry-etching technique such as reactive ion etching (RIE) in which an oxide film, silicon, aluminum and the like that are exposed at the opening of the resist are removed with gas that reacts with these materials or plasma. Semiconductor manufacturing techniques including them are used to form the angular velocity detection units SA1 and SA2 described below.

Figure 4:
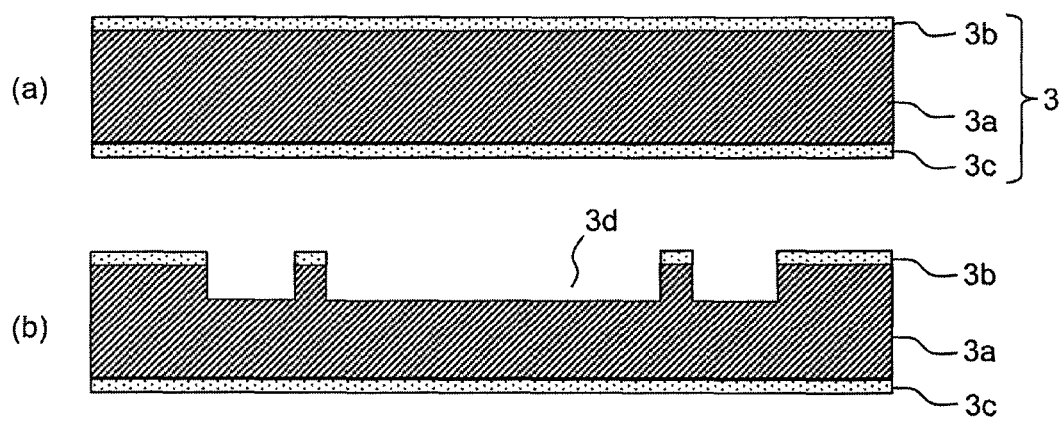
FIG. 4 illustrates the manufacturing method of a supporting substrate 3.

FIG. 4 illustrates the manufacturing method of the supporting substrate 3. The supporting substrate 3 has a function to support the secured parts 7 and 8 of the angular velocity detection unit SA1 described later. This supporting substrate 3 includes the silicon (Si) substrate 3a having the thermally-oxidized films 3b and 3c attached thereto, for example. Resist not illustrated on the substrate 3 is processed by the photolithography technique to form an opening. The oxidized film 3b that is exposed at the opening is removed with gas or liquid such as hydrogen fluoride. Then, the silicon substrate 3a exposed is removed by dry etching based on RIE, a wet-etching technique using alkaline chemicals such as TMAH or KOH, and the like, whereby the space 3d is formed to enable the motion of the movable parts 1A, 1B, 2A and 2B.

Figure 5:
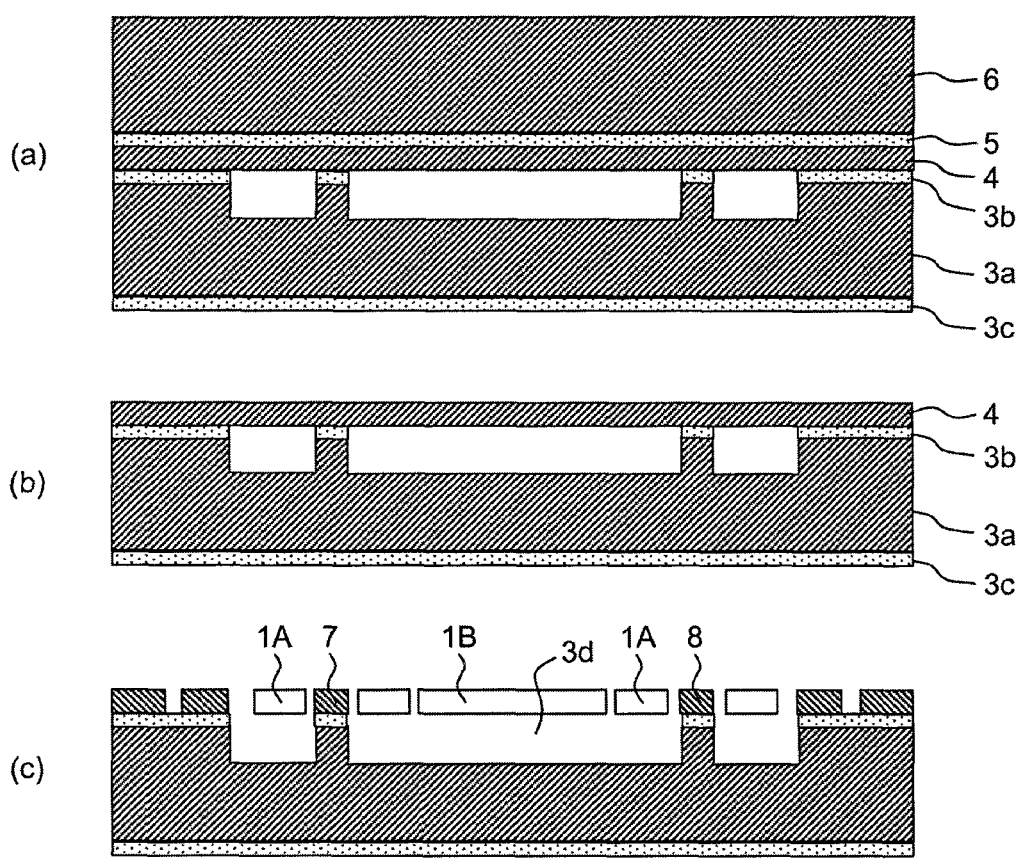
FIG. 5 illustrates the process to form movable parts 1A, 1B, 2A and 2B and elements of the angular velocity detection units SA1 and SA2 described later.

FIG. 5 illustrates the process to form the movable parts 1A, 1B, 2A and 2B and the elements of the angular velocity detection units SA1 and SA2 described later. A silicon-on-insulator (SOI) substrate including a device layer 4, an intermediate insulation layer 5 and a handle layer 6 is bonded to the supporting substrate 3. In the present Embodiment 1, hydrogen-bond is applied to bond the supporting substrate 3 and the SOI substrate, in which the surfaces of the supporting substrate 3 and the SOI substrate are cleaned with plasma, and then are washed with water to form hydroxyl groups thereon. Then, their bonding is enhanced by heating at about 1,000° C. Instead of such a bonding method, the supporting substrate 3 and the SOI substrate may be bonded by anodic bonding in which the supporting substrate 3 is made of glass, to which high voltage is applied, thus bonding the supporting substrate to the SOI substrate, or by covalent bonding using fritted glass or metal adhesive (FIG. 5a).

After bonding the supporting substrate 3 and the SOI substrate, the handle layer 6 is removed by wet-etching using alkaline chemicals or by dry-etching based on RIE, and then the intermediate insulation layer 5 is removed using hydrogen fluoride (HF) solution, whereby the configuration shown in FIG. 5b can be obtained. Next, the device layer 4 is processed by the photolithography technique and the DRIE technique, thus forming the elements such as the secured parts 7 and 8 and the movable parts 1A and 1B on the device layer 4 (FIG. 5c).

Figure 6:
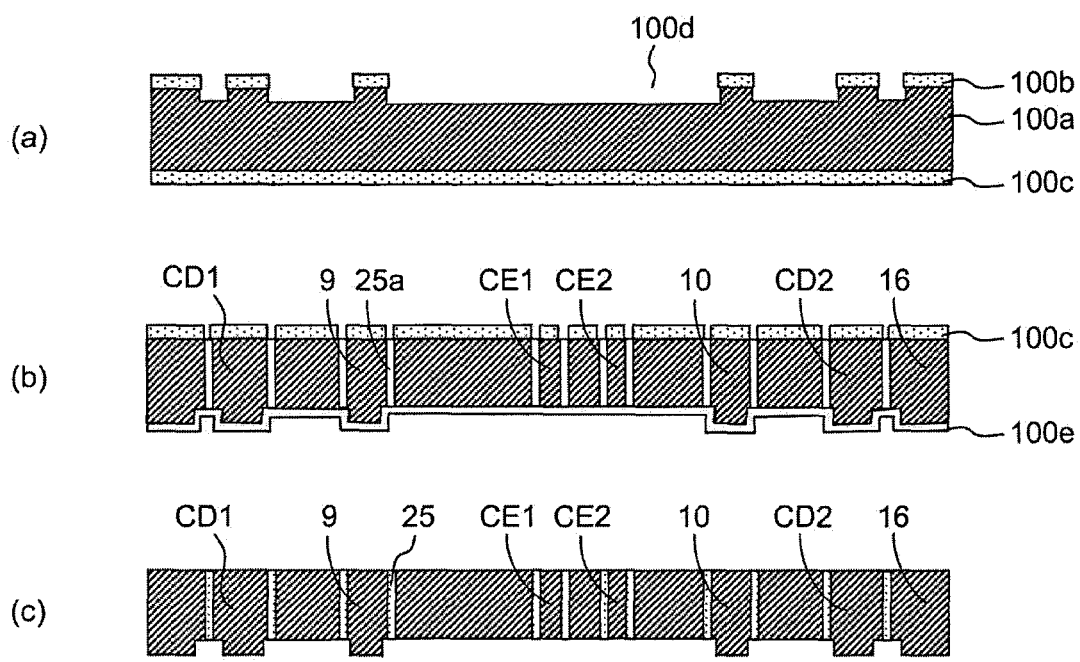
FIG. 6 illustrates the process to form a cap 100.

FIG. 6 illustrates the process to form the cap 100. The cap 100 has a function as an electrode to transmit electronic signals from the external control circuit 50 to the movable parts 1A and 2A and a function as the detection electrodes CE1, CE2, CE3 and CE4 described later. Firstly, a silicon cap substrate 100a having oxide films 100b and 100c attached thereto is prepared, and gaps 100d are formed between the movable parts 1A, 1B, 2A and 2B and the detection electrodes CE1, CE2, CE3 and CE4 by the photolithography technique and wet-etching based on DRIE or using alkaline chemicals (FIG. 6a).

Next, the cap substrate 100a is thermally-oxidized to form an oxide film 100e at the surface of silicon that is exposed when the gaps 100d are formed. Then, the oxide film 100c is processed, and then the cap substrate 100a is processed using the processed oxide film as a mask to reach the oxide film 100e by DRIE, thus forming electrodes CD1, 9, CE1, CE2, 10, CD2 that are electrically independent and a dummy part 16. At this time, the oxide film 100e functions as a layer to stop the DRIE processing, i.e., as an etching stop layer, and functions to support these electrodes CD1, 9, CE1, CE2, 10, CD2 and the dummy part 16 that are completely separated from the surrounding silicon by the grooves 25a formed by DRIE processing (FIG. 6b).

Next, the cap 100 is heated to be a high temperature, thus growing the thermally-oxidized film 25 until the grooves 25a are completely embedded. When the oxide film 25 is formed by heating silicon to be a high temperature, the oxide film will be formed so that 45% and 55% thereof are formed inside and outside of the silicon, respectively, while setting the silicon surface as a boundary. In the principle of thermally-oxidized film growth, it takes an unpractically long time to form the oxide film to 4 μm or more, and so the width of the grooves 25a is 4 μm. The aspect ratio that is defined by the width and the depth of the grooves 25 for the processing of DRIE is 25 or less that is suitable for mass production. That is, the grooves formed have the width of 4 μm and the depth of 100 μm. After the grooves 25 are embedded entirely by thermally-oxidization, the thermally-oxidized films 100b, 100c, and 100e formed at the surfaces of the cap substrate 100a are removed with hydrogen fluoride solution (FIG. 6c).

Figure 7:
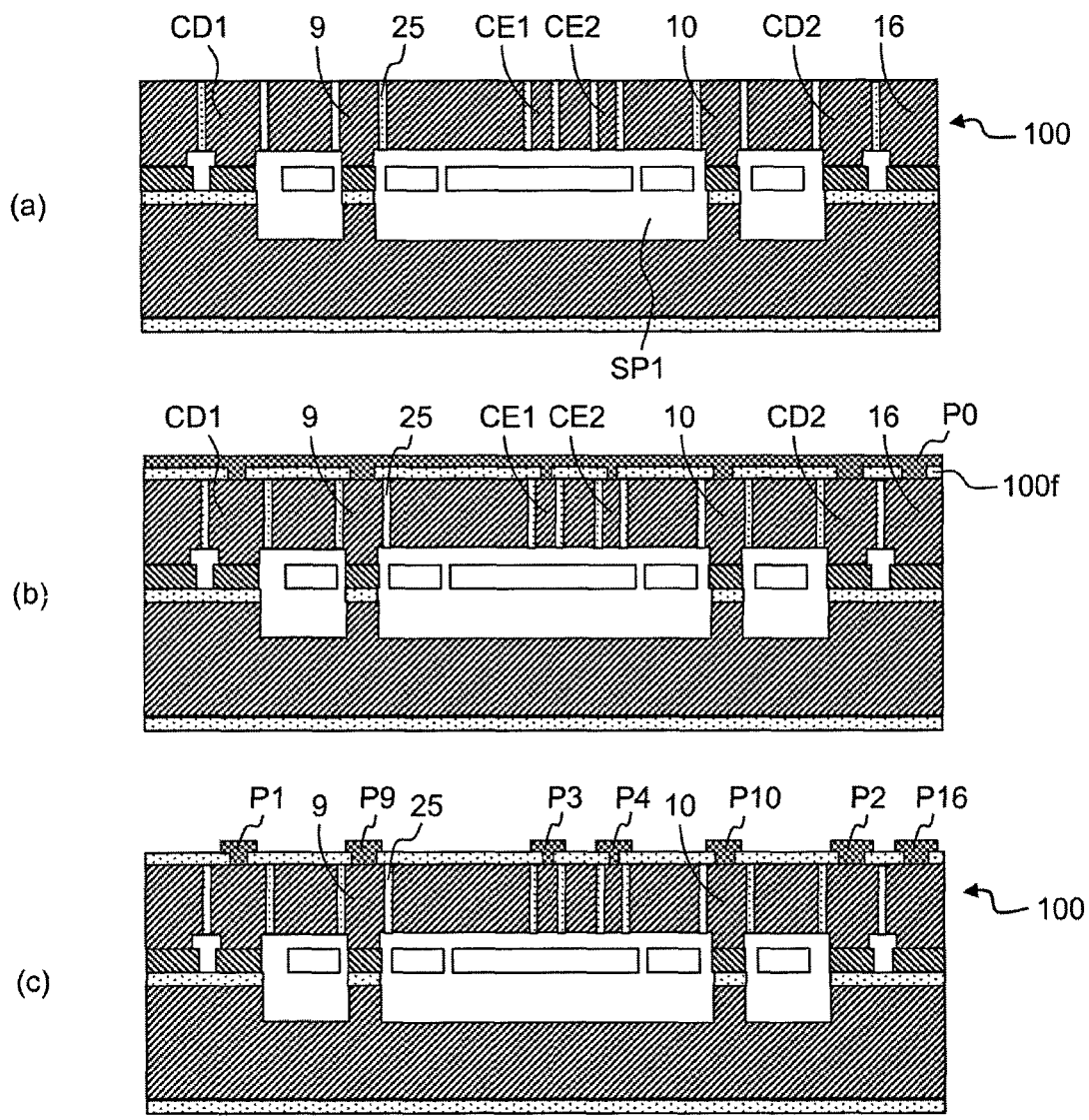
FIG. 7 describes the process to bond a device layer 4 and a supporting substrate 3 described referring to FIG. 5, and a cap 100, and the process to form metal wiring at the cap 100.

FIG. 7 describes the process to bond the device layer 4 and the supporting substrate 3 described referring to FIG. 5, and the cap 100, and the process to form metal wiring at the cap 100. The cap 100 (FIG. 6c) and the device layer 4 and the supporting substrate 3 (FIG. 5c) can be bonded by the same method as that for bonding of the SOI substrate and the substrate 3 as stated above (FIG. 7a). At this time, the surrounding pressure during bonding is controlled, thus controlling the pressure in the space SP1 in which the movable parts 1A and 1B are enclosed.

Next, a TEOS film (SiO$_2$) 100f is formed by chemical vapor deposition (CVD), and then openings are formed on the electrodes CD1, 9, CE1, CE2, 10, CD2 and the dummy part 16. On top of that, a pad layer P0 made of aluminum is formed by sputtering (FIG. 7b).

Next, the pad layer P0 is processed to form pads P1, P2, P3, P4, P9, P10 and P16, whereby the angular velocity detection units SA1 and SA2 of the angular velocity sensor SA is completed (FIG. 7c).

The above describes the case where the angular velocity detection units SA1 and SA2 are configured as separate chips for the purpose of description, and the angular velocity detection units SA1 and SA2 may be formed on one chip. As stated above, since the angular velocity detection units SA1 and SA2 can be manufactured by the exactly same manufacturing steps, the above method can be clearly used to form the two angular velocity detection units SA1 and SA2 on the same supporting substrate 3 as well.

That is the descriptions on the method to manufacture the angular velocity sensor SA. The following describes the operating principle of the angular velocity sensor SA.

Embodiment 1

Operating Principle of Angular Velocity Sensor SA

Figure 8:
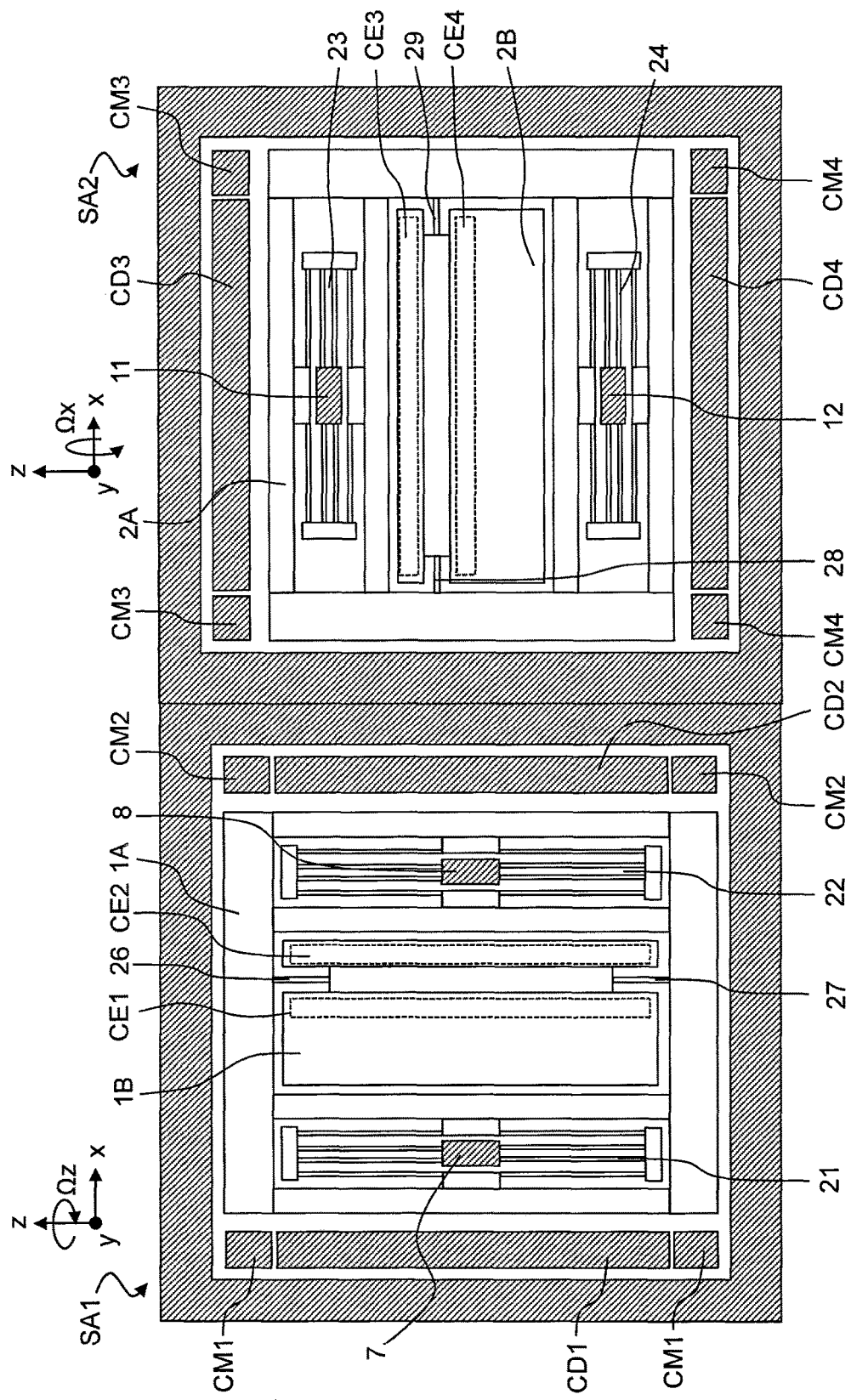
FIG. 8 is a plan view of the angular velocity detection units SA1 and SA2.

FIG. 8 is a plan view of the angular velocity detection units SA1 and SA2. Referring now to FIG. 8, the detailed configuration of the angular velocity detection units SA1 and SA2 is described below.

The movable parts 1A and 2A are suspended from the secured parts 7, 8, 11 and 12 via support beams 21, 22, 23 and 24 that are flexible in their driving directions. The secured parts 7, 8, 11 and 12 are formed to have a relatively large area, and are secured to the silicon substrate 3a via the oxide film 3b.

The movable parts 1B and 2B are suspended from the movable parts 1A and 2A via detection beams 26, 27, 28 and 29. When angular velocity is applied to the angular velocity detection units SA1 and SA2 (acceleration is applied so as to generate the angular velocity), the movable parts 1B and 2B are displaced in the detection directions.

Electrodes CM1, CM2, CM3 and CM4 are monitor electrodes to monitor the amplitude of the driving electrodes.

Figure 9:
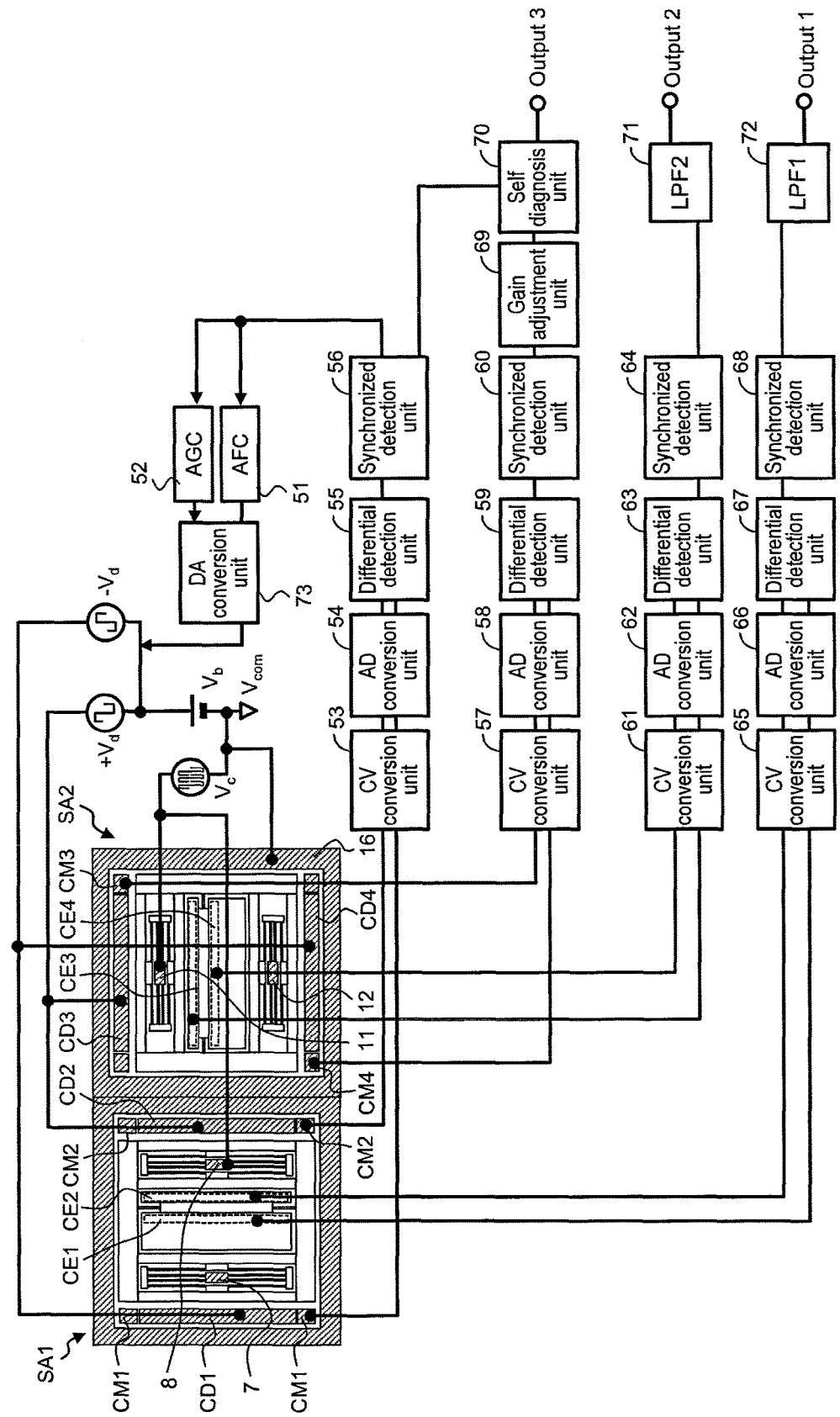
FIG. 9 is a block diagram illustrating the circuit configuration of the angular velocity sensor SA.

FIG. 9 is a block diagram illustrating the circuit configuration of the angular velocity sensor SA. The following describes functional parts of FIG. 9.

The two movable parts 1A and 2A are excited in their driving directions by the driving electrodes CD1, CD2, CD3 and CD4. A signal Vcom+Vb+Vd is applied to the driving electrodes CD1 and CD3 as a driving signal, and a signal Vcom+Vb−Vd is applied to the driving electrodes CD2 and CD4 as a driving signal. Vcom is then applied to the movable parts 1A and 2A via the common electrodes 9, 10, 13 and 14 (the drawing does not illustrate 13 and 14) of the cap 100 that are connected to the secured parts, 7, 8, 11 and 12. That is, the driving electrodes CD1, CD2, CD3 and CD4 and the movable parts 1A and 2A have a potential difference of Vb±Vd therebetween, and the potential difference generates an electrostatic force that oscillates the two movable parts 1A and 2A in their driving directions.

The movable parts 1A and 2A and the support beams 21, 22, 23 and 24 constitute a driving vibration system. An auto frequency control (AFC) 51, an auto gain control (AGC) 52 and a DA conversion part 73 constitute a driving circuit that outputs a driving signal to each driving vibration system.

The secured parts 7, 8, 11 and 12 further receive a carrier signal Vc described later via the common electrodes 9, 10, 13 and 14, and the frequency of the carrier signal Vc is a few hundreds kHz, which is sufficiently too high for the driving vibration system to follow, and so the carrier signal Vc does not serve as a driving force of the driving vibration system.

Driving amplitude that is generated by the application of the driving signal to the movable parts 1A and 2A can be detected by converting a change in capacitance between the driving monitor electrodes CM1, CM2, CM3 and CM4 and the movable parts 1A and 2A into a voltage signal. Referring to FIG. 9, the principle for detection is described below.

When the carrier signal Vc at a few hundreds kHz is applied to the common electrodes 9, 10, 13 and 14, the signal propagates through the secured parts 7, 8, 11 and 12, the support beams 21, 22, 23 and 24 and the movable parts 1A and 2A, and generates charge transfer corresponding to the capacitance of the driving amplitude monitor electrodes CM1, CM2, CM3 and CM4. CV conversion units 53 and 57 convert such charge transfer into an analog voltage signal, and AD conversion units 54 and 58 further convert the same into a digital signal. Then differential detection units 55 and 59 calculate their respective signals. When the driving amplitude is 0, the capacitance values at the initial stage are compensated mutually, and so the voltage input to synchronized detection units 56 and 60 is 0. When the movable parts 1A and 2A vibrate, the capacitance of the driving amplitude monitor electrodes CM1 and CM3 increase so as to follow the driving amplitude of the movable parts 1A and 2A, and so the capacitance of the driving amplitude monitor electrodes CM2 and CM4 decrease, or a reverse change occurs.

Then, the differential detection units 55 and 59 output signals proportional to the driving amplitude. The synchronized detection units 56 and 60 convert this output signal into a low-frequency component (in the present embodiment 1, from DC to a few hundreds Hz) including the driving frequency component (in the present Embodiment 1, a few tens kHz) and DC as needed.

The angular velocity sensor SA further includes an AFC 51 based on Phase Locked Loop (PLL) to let the driving frequency ωd follow a change in natural frequency ωr1 of the driving vibration system of the angular velocity detection unit SA1 due to fluctuations in the surrounding environment (temperatures and pressure).

When the movable parts 1A and 2A vibrate in their driving directions, the movable part 1A of the angular velocity detection unit SA1 is driven in the x-axis direction, and so when the angular velocity is generated around the z-axis to generate a Coriolis force, such a force displaces the movable part 1B in the y-axis direction as the detection direction. In the angular velocity detection unit SA2, the movable part 2A is driven in the z-axis direction, and so when the angular velocity is generated around the x-axis to generate a Coriolis force, such a force displaces the movable part 2B in the y-axis direction as the detection direction. Such displacement of the movable parts 1B and 2B is detected as a change in capacity of the detection electrodes CE1 and CE2, and CE3 and CE4, respectively, which is then converted into an electric signal by CV conversion units 61 and 65, AD conversion units 62 and 66, differential detection units 63 and 67, and synchronized detection units 64 and 68, and is subjected to signal processing at low-pass filters (LPFs) 71 and 72 before outputting.

The movable parts 1B and 2B and the detection beams 26, 27, 28 and 29 make up a detection vibration system. The CV conversion units 61 and 65, the AD conversion units 62 and 66, the differential detection units 63 and 67, the synchronized detection units 64 and 68, and the LPFs 71 and 72 make up a detection circuit.

While the antiskid brake system can be configured to detect an angular velocity component of about a few tens Hz or less, an angular velocity component at higher frequencies has to be detected for the purpose of rollover detection. To respond to such different demands, the LPFs 71 and 72 are provided so as to correspond to the angular velocity detection units SA1 and SA2, respectively.

Although not illustrated, a correction circuit to correct temperature-dependency of the sensor output may be inserted between a switch SW3 and the LPFs 71 and 72.

The surrounding silicon conductor (dummy part 16), which is distributed on the supporting substrate 3, the cap 100 and the device layer 4 at areas other than the common electrodes 9, 10, 13 and 14, the driving electrodes CD1, CD2, CD3 and CD4, the monitor electrodes CM1, CM2, CM3 and CM4 and the detection electrodes CE1, CE2, CE3 and CE4, is connected to the potential at Vcom. Since the surrounding silicon conductor is fixed to a certain potential, signal interference with the surrounding electronic circuit on the system side, in which the LSI 50 and the angular velocity sensor SA are mounted, resulting from carrier wave Vc leaking to the outside of the angular velocity detection units SA1 and SA2, can be prevented. Another advantageous effect also is expected, which shields the influence of unnecessary high-frequency signals from the electronic circuit and the LSI 50 on the system side.

Embodiment 1

Principle of Driving at the Same Frequency

That is the description of the operating principle of the angular velocity sensor SA. The following describes the principle to drive the angular velocity detection units SA1 and SA2 having two different detection ranges with a driving signal at the same frequency.

The following Expression 1 is to calculate driving amplitude x of an angular velocity detection unit, Expression 2 is to calculate a Coriolis force Fc, and Expression 3 is a relational expression between the amplitude in the detection direction and the Coriolis force Fc.

[Equation 1]

$$x = \frac{F_d}{k_d} \frac{1}{\left\{\left[1 - \left(\frac{\omega_d}{\omega_r}\right)^2\right]^2 + \left[\frac{1}{Q_d}\frac{\omega_d}{\omega_r}\right]^2\right\}^{1/2}} \quad \text{(Expression 1)}$$

where x: driving displacement, ωd/2π: driving frequency, ωr: natural frequency in driving direction, Qd: mechanical quality factor in driving direction, kd: spring constant of support beams 21, 22, 23 and 24, Fd: driving force.

[Equation 2]

$$Fc = 2 \cdot m \cdot \Omega \cdot X \cdot \omega_d \cdot \cos(\omega_d \cdot t) \quad \text{(Expression 2)}$$

where

Fc: Coriolis force, m: weight of movable part, Ω: applied angular velocity, X: maximum amplitude in driving direction, ωd/2π: driving frequency, t: time.

[Equation 3]

$$y = Fc \cdot Q_s / k_s \quad \text{(Expression 3)}$$

where y: detection amplitude, Qs: mechanical quality factor in detection direction, ks: spring constant of detection beams 26, 27, 28 and 29.

It is understood from Expression 1 that, when the driving force Fd is constant in the driving vibration system made up of the movable parts 1A and 2A and the support beams 21, 22, 23 and 24, the driving displacement x depends on the driving frequency ωd/2π. When the natural frequency ωr of the driving vibration system agrees with the driving frequency ωd/2π, the maximum driving amplitude x can be obtained, and the driving amplitude x decreases with increasing a difference between the driving frequency ωd/2π and the natural frequency ωr.

It is understood from Expression 2 and Expression 3 that the Coriolis force Fc that is obtained based on the applied angular velocity Ω and the detection amplitude y have a proportional relationship to the driving amplitude x.

The angular velocity detection unit SA1 includes one driving vibration system made up of the movable part 1A and the support beams 21 and 22. The angular velocity detection unit SA2 includes one driving vibration system made up of the movable part 2A and the support beams 23 and 24. These driving vibration systems are mechanically separated so as not to have a path to share the vibration energy, and so they have their respective natural frequencies. That is, the angular velocity sensor SA is configured to drive the two driving vibration systems each having its own natural frequency at one driving frequency.

The two driving vibration systems of the angular velocity detection units SA1 and SA2 can adjust their respective natural frequencies by adjusting the lengths of the support beams 21, 22, 23 and 24. They are designed to have the same weight of the movable parts 1A, 1B, 2A and 2B, size of the driving electrodes CD1, CD2, CD3 and CD4, size of the detection electrodes CE1, CE2, CE3 and CE4 and the monitor electrodes CM1, CM2, CM3 and CM4 and spring constants of the detection beams 26, 27, 28 and 29 other than them. That is, including a common driving circuit and detection circuit as stated above, different driving amplitudes can be obtained from the two driving vibration systems.

Figure 10:
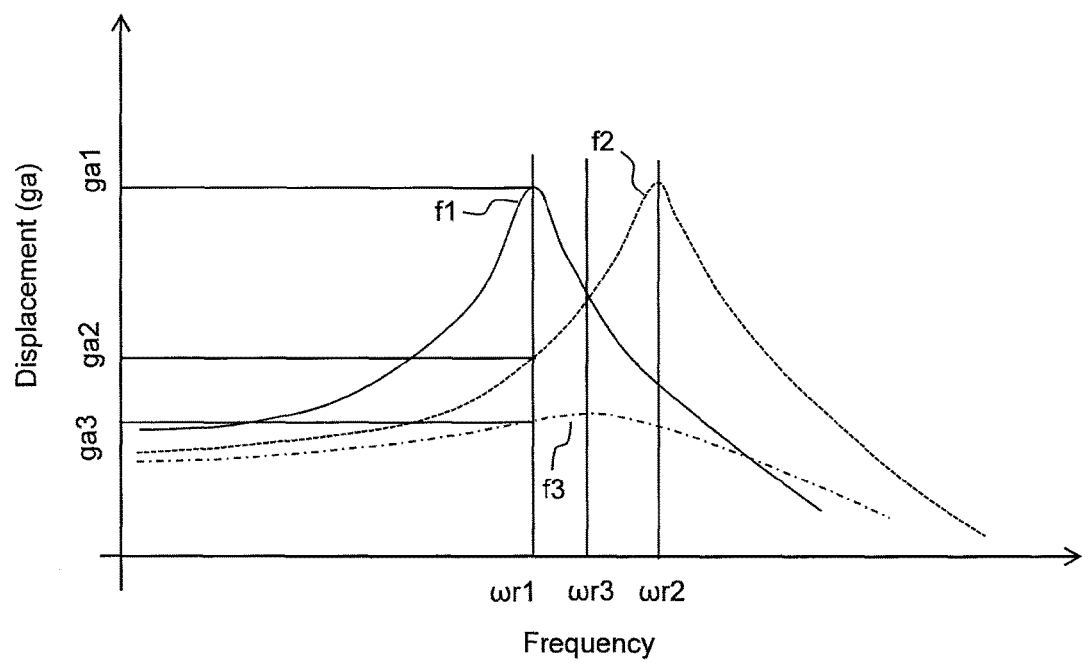
FIG. 10 illustrates frequency characteristics of two driving vibration systems and a detection vibration system of the angular velocity detection units SA1 and SA2.

Mutually different two driving amplitudes obtained means mutually different two angular velocity detection results obtained. In this way, the angular velocity sensor SA can have mutually different two angular velocity detection results while having a common driving circuit and such a detection circuit, and so there is no need to provide these circuits for each of the angular velocity detection units, and so the cost can be suppressed. In other words, the angular velocity sensor SA according to the present Embodiment 1 is configured to have mutually different driving amplitudes by adjusting the natural frequencies of the angular velocity detection units SA1 and SA2 while having a common driving circuit and such a detection circuit, whereby obtaining mutually different two angular velocity detection results. Referring to FIG. 10, the following describes mutually different driving amplitudes obtained by adjusting the natural frequencies in more details.

FIG. 10 illustrates frequency characteristics of the two driving vibration systems and the detection vibration system of the angular velocity detection units SA1 and SA2. In FIG. 10, f1 is the frequency characteristic of the driving vibration system of the angular velocity detection unit SA1, f2 is the frequency characteristic of the driving vibration system of the angular velocity detection unit SA2, and f3 is the frequency characteristic of the detection vibration system of the angular velocity detection units SA1 and SA2. FIG. 10 omits the description of "/$2\pi$" of each driving frequency for the sake of brevity. The same goes for the following descriptions on FIG. 10.

Herein, each characteristic is represented as one curve while disregarding variations in the processing. Although the frequency characteristics may differ slightly with such variations in the processing, such variations in frequency are from a few to a few tens Hz, which can be ignored in terms of the performance of a sensor. Further, although not described in details because it is an already known technique, the Coriolis force Fc may be cancelled out by an electrostatic force, and servo control may be performed using the voltage applied for the cancellation as the output of the sensor, whereby minute variations in performance of the sensor due to variations in processing can be suppressed. When influences on the sensor performance from variations are minor, correction by signal processing also is effective.

When the driving frequency $\omega d$ to drive the angular velocity detection units SA1 and SA2 agrees with the natural frequency curl of the driving vibration system of the angular velocity detection unit SA1, the amplitude obtained based on Expression 1 per unit driving force will be ga1 for the driving vibration system of the angular velocity detection unit SA1 and ga2 for the driving vibration system of the angular velocity detection unit SA2. For the detection vibration system, the detection amplitude for unit Coriolis force will be ga3 for both of the angular velocity detection units SA1 and SA2.

The angular velocity detection units SA1 and SA2 can be used for the purposes to detect skidding and rollover of a vehicle, respectively. In general, in order to detect skidding, the angular velocity of ±100 degrees/second around the z-axis has to be detected in general as illustrated in FIG. 8, and in order to detect rollover, the angular velocity of ±400 degrees/second around the x-axis has to be detected in general as illustrated in FIG. 8 similarly. That is, in order to detect skidding and rollover at the same time, different detection ranges on different detection axes have to be dealt with.

According to Expression 2, let that the driving weight m of the movable parts 1A and 2A, the driving frequency $\omega d$ and the angular velocity applied $\Omega$ are constant, the Coriolis force Fc and the detection amplitude y that are converted as a sensor output become a function of the driving amplitude x only. In this way, even when there are fluctuations in the surrounding pressure and oscillation disturbance, the sensitivity of the sensor can be kept constant. To keep the reliability, the driving amplitude x has to be always monitored, and feed-back control is performed so as to control it to be a constant value. To this end, the angular velocity sensor SA inputs any one of the driving amplitudes of the angular velocity detection units SA1 and SA2 to the AGC 52, thus performing feed-back control so that it follows a target value set beforehand. The output from the AGC 52 is converted into an analog signal by the DA conversion part 73, and is applied to the driving electrodes CD1, CD2, CD3 and CD4.

It is desirable that the driving amplitude of the skid detection unit (angular velocity detection unit SA1), to which higher precision is required, be input to the AGC 52 for feed-back control. That is, since a larger driving amplitude means larger sensitivity of the sensor, it is desirable that the driving frequency $\omega d$ be set to follow the natural frequency curl of the angular velocity detection unit SA1 having the narrowest detection range to have the maximum displacement.

That is the description of different driving amplitudes that are obtained based on a driving signal at the same frequency. This enables the angular velocity detection units SA1 and SA2 to have a common driving circuit. The following describes a method to provide a common detection circuit for the angular velocity detection units SA1 and SA2.

In order to deal with a plurality of detection ranges with one detection circuit, the Coriolis force Fc that is generated when the maximum angular velocity of each range occurs has to be set at the same value for the angular velocity detection units SA1 and SA2, and the detection electrodes CE1, CE2, CE3 and CE4 have to have the same capacity change characteristic. Note here that when the aforementioned servo control is used, the Coriolis force Fc only has to be made the same between the angular velocity detection units.

Expression 2 shows that the Coriolis force Fc is proportional to the driving amplitude x. Then, in order to generate the same Coriolis force Fc at different detection ranges of the angular velocity detection units SA1 and SA2, the relationship of the following Expression 4 has to hold between the detection range and the driving amplitude.

[Equation 4]

Detection range 1/detection range 2=driving amplitude 2(ga2)/driving amplitude 1(ga1)    (Expression 4)

where
detection range 1: detection range of angular velocity detection unit SA1,
detection range 2: detection range of angular velocity detection unit SA2,
driving amplitude 1: driving amplitude of angular velocity detection unit SA1 (ga1), and
driving amplitude 2: driving amplitude of angular velocity detection unit SA2 (ga2).

That is, when the detection range 1 is ±100 degrees/second and the detection range 2 is ±400 degrees/second, and when the driving amplitude 2 (ga2) is set at 1 µm, for example, then the driving amplitude 1 (ga1) will be set at 4 µm. Further, a determination may be made as to whether these two driving amplitudes comply with the relationship of Expression 4, which can be used as means to check whether the sensor operates correctly or not. In this case, a gain adjustment unit 69 in FIG. 9 processes the driving amplitude of the angular velocity detection unit SA2 based on the relational expression of FIG. 4. A self diagnosis unit 70 compares the output from the gain adjustment unit 69 and the driving amplitude of the angular velocity detection unit SA1 (output from the synchronized detection unit 56) to determine whether it is within a designated range or not. A result thereof is output as a diagnosis result (output 3).

Figure 11:
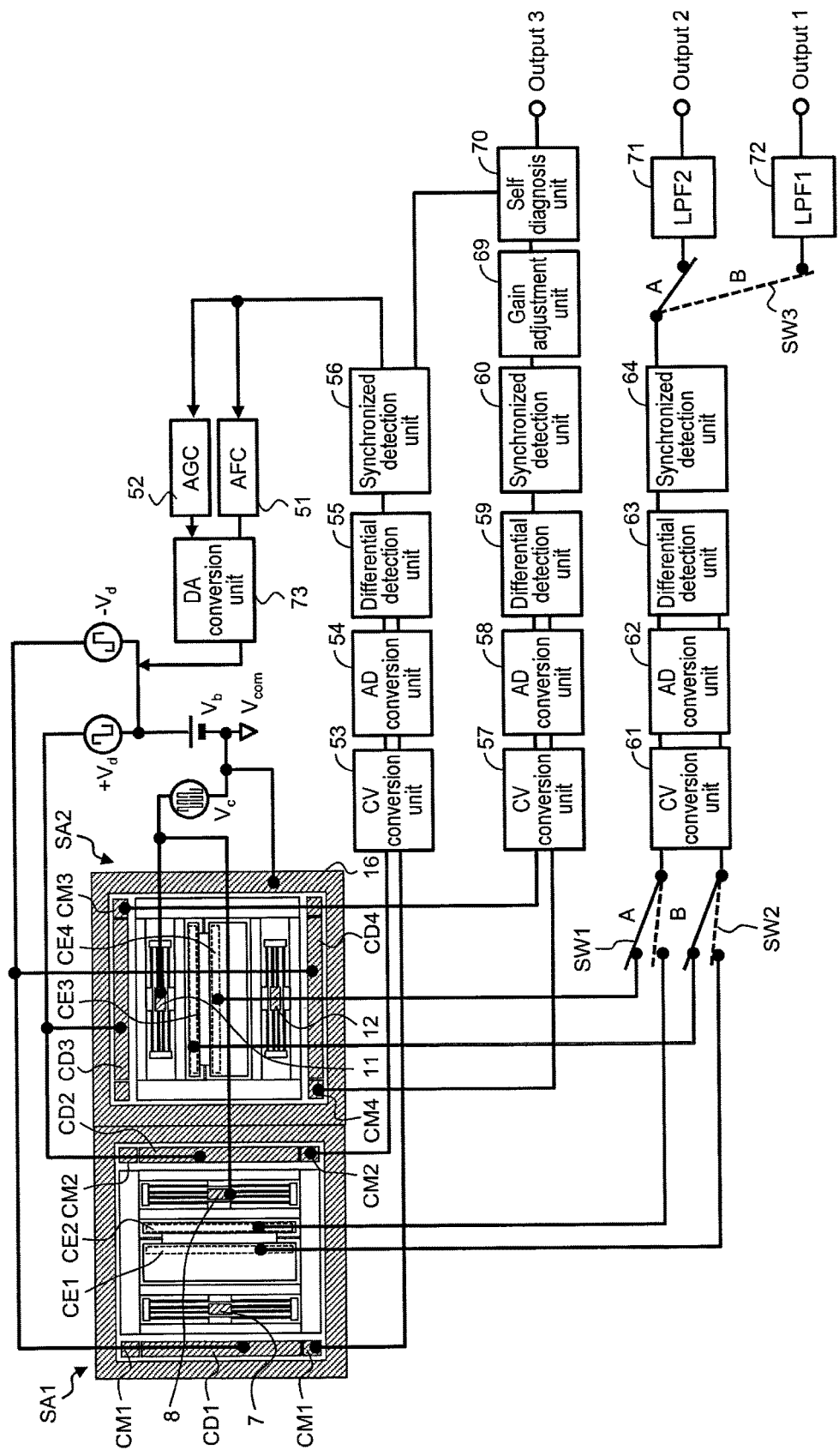
FIG. 11 illustrates an exemplary circuit configuration where the detection circuit is shared in a time-division manner.

FIG. 11 illustrates an exemplary circuit configuration where the detection circuit is shared in a time-division manner. In the angular velocity sensor SA, the two detection units SA1 and SA2 have the same maximum capacity change amount of the detection electrodes CE1, CE2, CE3 and CE4. That is, the CV conversion units 61 and 65, the AD conversion units 62 and 66, the differential detection units 63 and 67, and the synchronized detection units 64 and 68 can be shared in a time-division manner. In the example of FIG. 11, switches SW1 and SW2 are used to select the input from the angular velocity detection units SA1 and SA2, and the switch SW 3 switches between the LPFs 71 and 72. These three switches are mutually synchronized, and are switched at the same timing. The configuration to share the detection circuit in a time-division manner similarly to FIG. 11 can be used for the following embodiments as well.

Embodiment 1

Summary

As stated above, the angular velocity sensor SA according to the present Embodiment 1 includes a plurality of angular velocity detection units each including a driving vibration system having a different natural frequency, each angular velocity detection unit being driven by a driving signal at a common driving frequency. The driving frequency can be set at any one of the natural frequencies. In this case, any one of the angular velocity detection units is driven in a resonance mode, and the remaining angular velocity detection units are driven in a non-resonance mode. Since the angular velocity detection unit driven in a resonance mode yields a driving amplitude that is larger than that of the angular velocity detection units that are driven in a non-resonance mode, the former can generate an output signal that is larger than that from the latter angular velocity detection units for the same angular velocity. As a result, a plurality of angular velocity detection units each having a different detection range that is defined as the magnitude of the angular velocity applied and the signal generated can be implemented with the same driving frequency output from the common driving circuit.

The angular velocity sensor SA according to the present Embodiment 1 is configured to let the angular velocity detection units SA1 and SA2 having different detection ranges generate the same Coriolis force Fc in accordance with the relationship of Expression 4. This allows detection signals output from the angular velocity detection units SA1 and SA2 to be processed using a detection circuit having the same specifications.

The angular velocity sensor SA according to the present Embodiment 1 includes the angular velocity detection units that are disposed in different directions, whereby angular velocities in different detection directions can be detected. This allows an angular velocity sensor having a plurality of different detection directions using a detection circuit having the same specifications.

In the present Embodiment 1, the angular velocity sensor SA exemplified is a non tuning-fork type driving vibration system made up of one movable part 1A and 1B and the support beams 21, 22, 23 and 24 that are flexible in their driving directions for their driving directions. The present invention is not limited to such a configuration, and is applicable to the configuration including two movable parts 1A and 2A for each driving direction, where the two movable parts are jointed with a beam structure so as to share the vibration energy to be a tuning-fork structure. In this case, at least one of the angular velocity detection units SA1 and SA2 is configured as a tuning-fork type angular velocity sensor. The advantageous effect from the tuning-fork structure is well-known, and so they are not described in details. The angular velocity sensor SA according to the present Embodiment 1 is not limited to a non tuning-fork type structure.

The present Embodiment 1 describes the AFC 51 provided to let the driving frequency $\omega d$ follow a change in the natural frequency $\omega r1$. This is not a limiting example, as long as different driving amplitudes can be obtained based on the same driving frequency. That is, the idea of the present invention can be, of course, applicable to non-resonance mode driving where the driving frequency $\omega d$ and the natural frequency $\omega r1$ do not agree with each other.

In the present Embodiment 1, the driving electrodes CD1, CD2, CD3 and CD4 of the angular velocity detection units SA1 and SA2 and the monitor electrodes CM1, CM2, CM3 and CM4 are represented in a parallel flat plate structure for convenience, and they may have a comb finger structure including flat plates meshing with each other alternately. Such electrodes in a comb finger structure can reduce non-linear behavior, which is seen when the distance between electrodes varies in the parallel flat plate structure. That is, whereas electric charge is proportional to the reciprocal of an interelectrode distance in the parallel flat plate structure, it is proportional to the overlapping area of opposed electrodes in the comb finger structure.

Although the present Embodiment 1 describes the example where the detection results from the angular velocity detection units are output in parallel as outputs 1 to 2, the output terminal may be single. In this case, a plurality of detection results is output as a serial signal.

Embodiment 2

Embodiment 1 describes the case of including driving vibration systems each having a different natural frequency, thus generating different driving amplitudes based on a driving signal at the same frequency. Embodiment 2 of the present invention describes an exemplary configuration to change a signal level of a driving signal applied to each angular velocity detection unit, thus generating different driving amplitudes. The following descriptions omit the parts common to those of Embodiment 1 and focus on differences.

Figure 12:
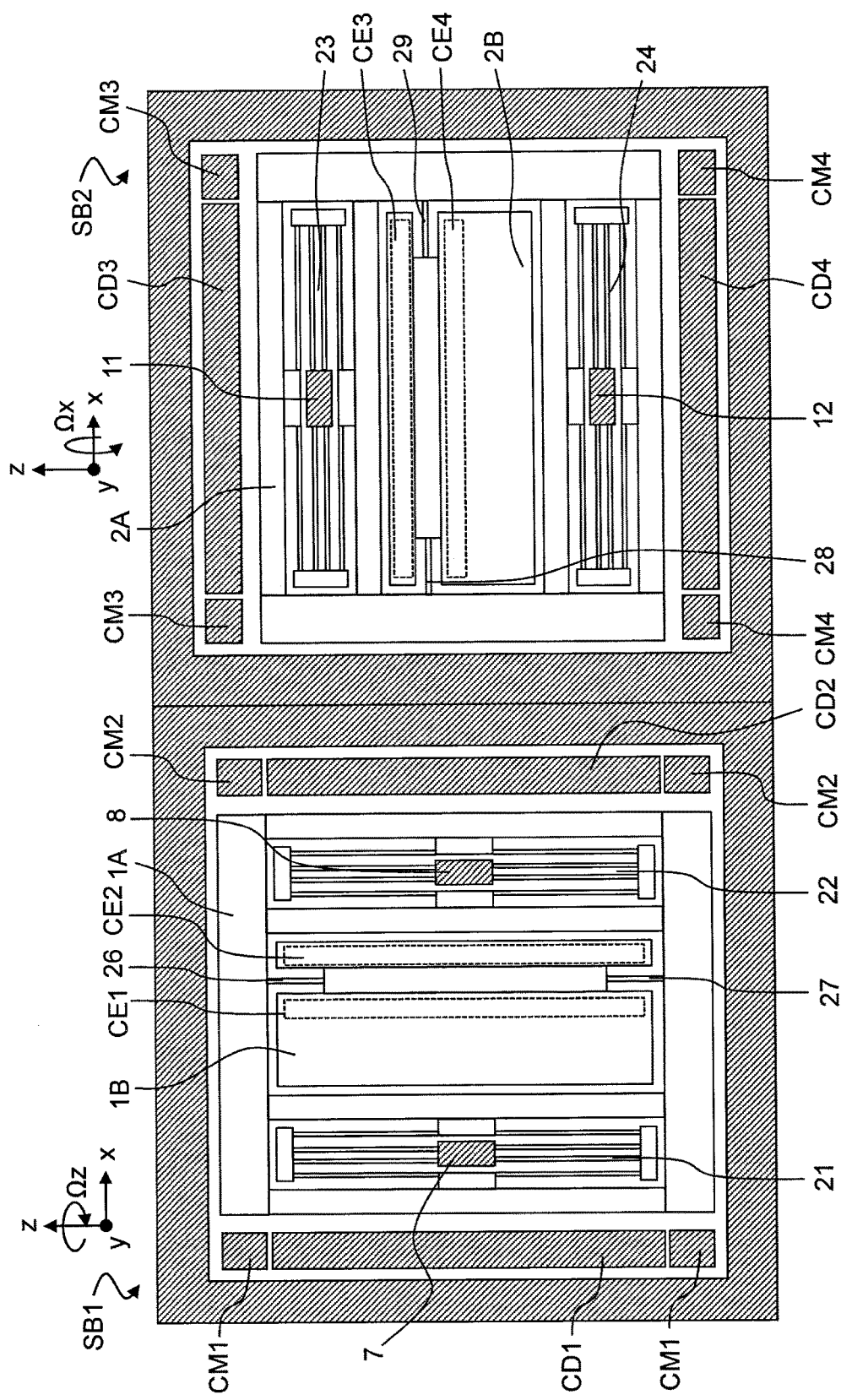
FIG. 12 is a plan view of an angular velocity sensor SB in Embodiment 2.

FIG. 12 is a plan view of an angular velocity sensor SB in the present Embodiment 2. The angular velocity sensor SB can be manufactured by a method similar to that for the angular velocity sensor SA in Embodiment 1. The angular velocity sensor SB according to the present Embodiment 2 includes angular velocity detection units SB1 and SB2 having the exactly same shape, which are driven at different driving voltages, thus generating different driving amplitudes and so obtaining different detection results. That is, unlike Embodiment 1 where the lengths of the support beams 21, 22, 23 and 24 are adjusted so that the natural frequencies $\omega r1$ and $\omega r2$ are differentiated, the angular velocity sensor SB of the present Embodiment 2 includes the exactly same angular velocity detection units SB1 and SB2, which are disposed while changing their orientations only so as to agree with axes of the angular velocities to be detected.

According to Expression 2, let that the driving weight m of the movable parts 1A and 2A, the driving frequency $\omega d$ and the angular velocity applied $\Omega$ are constant, the Coriolis force Fc and the detection amplitude y that are converted as a sensor output become a function of the driving amplitude x only. It is understood from Expression 1 that the driving amplitude x is the function of the driving force Fd. Then, the driving force Fd that is generated between the movable parts 1A and 2A and the driving electrodes CD1, CD2, CD3 and CD4 can be defined by the following Expression 5:

[Equation 5]

$$F_d = 2\frac{\varepsilon S}{d^2} V_b V_d \qquad \text{(Expression 5)}$$

where

Fd: driving force, $\in$: dielectric constant of air, S: opposed area between movable parts 1A, 2A and driving electrodes CD1, CD2, CD3 and CD4, d: distance between movable parts 1A, 2A and driving electrodes CD1, CD2, CD3 and CD4, Vb: bias voltage applied between movable parts 1A, 2A and driving electrodes CD1, CD2, CD3 and CD4, Vd: driving signal applied to driving electrodes CD1, CD2, CD3 and CD4.

It is understood from Expression 5 that the driving force Fd is proportional to the driving signal Vd. That is, the driving amplitude x is proportional to the driving force Fd, and the driving force Fd is proportional to the driving signal Vd, and so the driving amplitude x can be controlled by controlling the driving signal Vd. The angular velocity sensor SB according to the present Embodiment 2 is based on this to implement driving amplitude to meet the condition of Expression 4.

Figure 13:
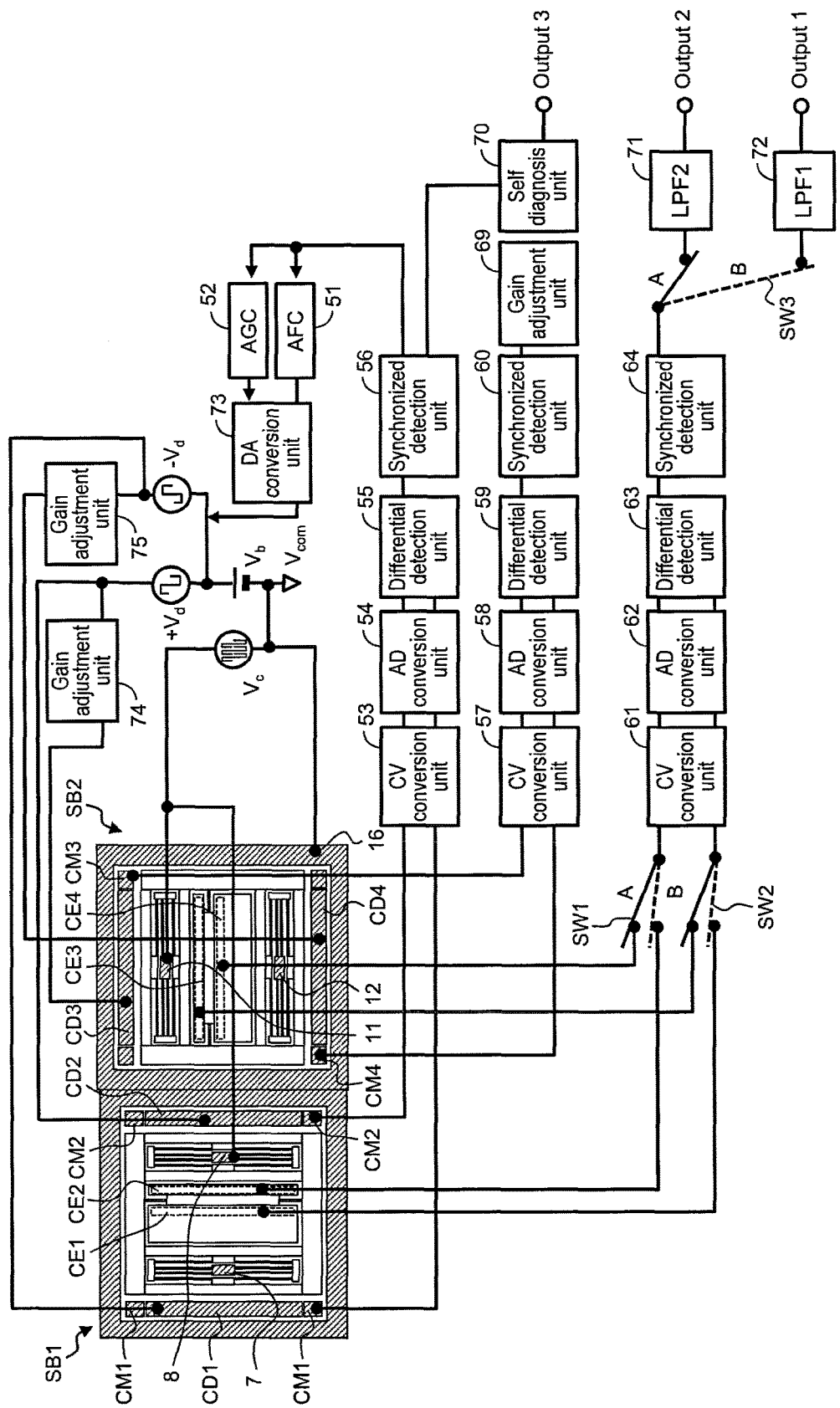
FIG. 13 is a block diagram illustrating the circuit configuration of the angular velocity sensor SB.

FIG. 13 is a block diagram illustrating the circuit configuration of the angular velocity sensor SB. The angular velocity sensor SB includes gain adjustment units 74 and 75 in addition to the circuit configuration of Embodiment 1. The drawing illustrates the circuit configuration similar to that of FIG. 11, which may have the circuit configuration of FIG. 9.

The gain adjustment units 74 and 75 adjust signal levels of driving signals Vd to be applied to the angular velocity detection units SB1 and SB2, respectively. This can generate mutually different driving amplitudes while including the exactly same angular velocity detection units SB1 and SB2, thus providing mutually different detection ranges.

For the same reason as that described in Embodiment 1, it is desirable that the driving frequency $\omega d$ is set to follow the natural frequency of the angular velocity detection unit having the narrowest detection range so as to have the maximum displacement. It is desirable that, following the example of Embodiment 1, the signal level of the driving signal Vd increase so as to maximize the displacement of the driving vibration system of the angular velocity detection unit SA1.

Embodiment 2

Summary

As stated above, the angular velocity sensor SB according to the present Embodiment 2 is configured so that driving signals at the same frequency and having different signal levels are applied to the angular velocity detection units, and so the driving amplitudes of the angular velocity detection units have different values in association with the signal levels of the driving signals applied thereto. Then, similarly to Embodiment 1, a plurality of angular velocity detection units each having a different detection range that is defined as the magnitude of the angular velocity applied and the signal generated can be implemented with the same driving frequency output from the common driving circuit.

In the present embodiment 2, the angular velocity detection units SB1 and SB2 are formed on one supporting substrate 3, and they may be divided into two chips for configuration. Orientations only of exactly the same two chips may be differentiated during mounting, whereby manufacturing yield can be improved. That is, when the two angular velocity detection units SB1 and SB2 are configured as one chip, if malfunction occurs at one of them, both of them cannot be used. On the other hand, the two-chip configuration can use the chips effectively.

The present embodiment 2 includes the exactly same two angular velocity detection units SB1 and SB2. However, strictly speaking, it seems difficult to realize two angular velocity detection units having the exactly same natural frequency because of variations or the like during manufacturing. Note that if two natural frequencies are close to each other in a certain range, variations of performance can be ignored, or the gain adjustment units 74 and 75 may correct the variations during manufacturing.

Embodiment 3

Embodiment 3 of the present invention describes an exemplary configuration such that capacitance determined by the driving electrodes CD1 to CD4 and the movable parts 1A and 2A is made different for each angular velocity detection unit, thus generating different driving amplitudes. The following descriptions omit the parts common to those of Embodiment 1 and focus on differences.

Figure 14:
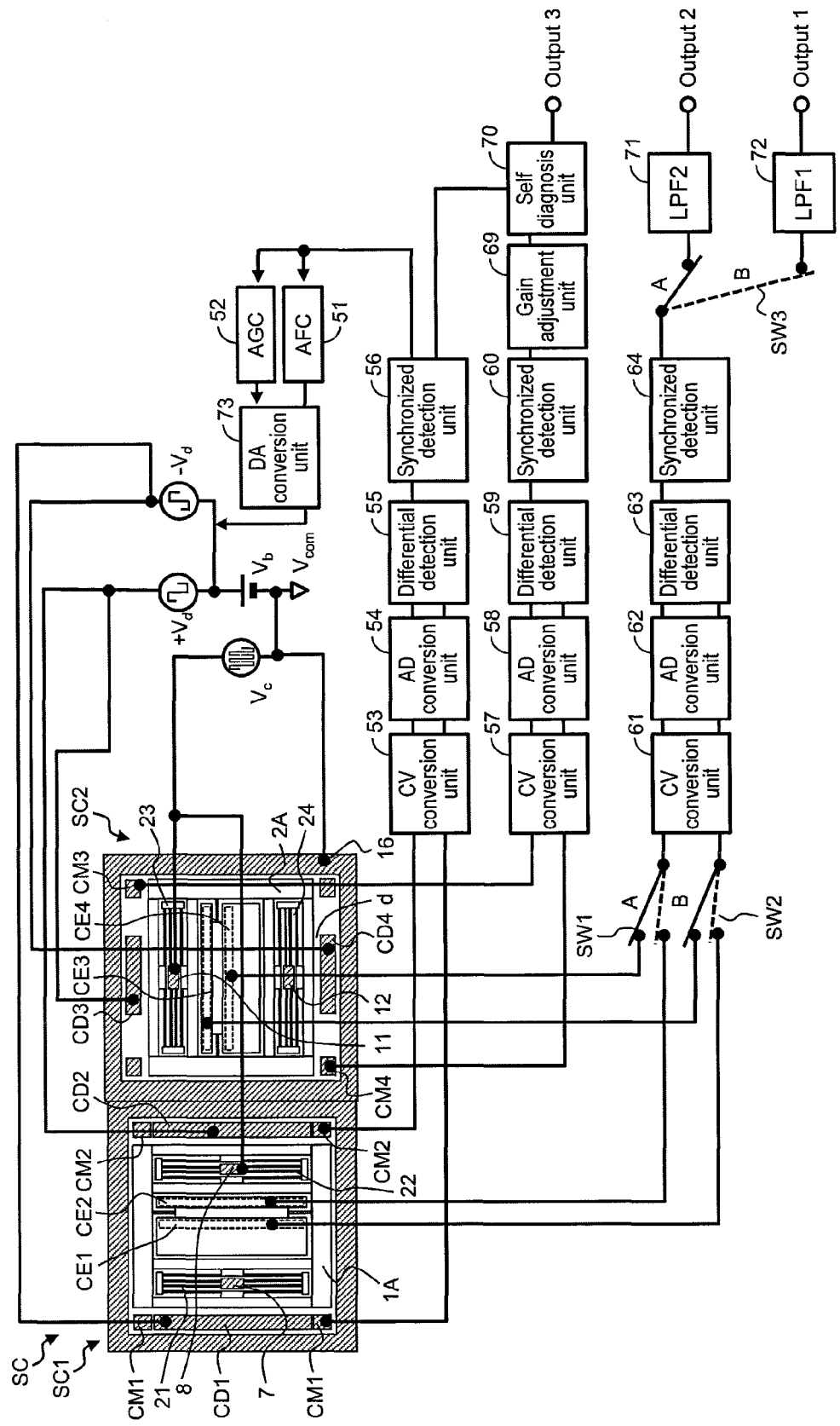
FIG. 14 is a plan view of an angular velocity sensor SC according to Embodiment 3 and a block diagram illustrating the circuit configuration.

FIG. 14 is a plan view of an angular velocity sensor SC according to the present Embodiment 3 and a block diagram illustrating the circuit configuration. The angular velocity sensor SC can be manufactured by a method similar to that for the angular velocity sensor SA and the angular velocity sensor SB in Embodiments 1 and 2. The angular velocity detection unit SC includes angular velocity detection units SC1 and SC2 each having a different size of the driving electrodes and a different interelectrode distance.

The angular velocity sensor SC is configured to adjust the area S of a part where the driving electrodes CD1, CD2, CD3 and CD4 and the movable parts 1A and 2A are opposed and the gap d between the driving electrodes CD1 to CD4 and the movable parts 1A and 2A as shown in Expression 5, thus letting the angular velocity detection units SC1 and SC2 generate mutually different driving forces Fd and different amplitudes x.

For instance, it is understood from the relationships of Expression 1 and Expression 5 that halving the opposed area S means halving of the driving force Fd as well, and so the driving amplitude x also is halved proportionately. Adjustment of the gap d between the driving electrodes CD1 to CD4 and the movable parts 1A and 2A also can yield a different driving displacement x. According to the relationships of Expression 1 and Expression 5, doubling the gap d means one-quarter of the value of the driving force Fd, and accordingly the driving displacement x also becomes one-quarter.

Embodiment 3

Summary

As stated above, the angular velocity sensor SC according to the present Embodiment 3 includes two angular velocity detection units SC1 and SC2 each having a different opposed area S between the driving electrodes CD1 to CD4 and the movable parts 1A and 2A or a different gap d therebetween. Then, similarly to Embodiment 1, a plurality of angular velocity detection units each having a different detection range that is defined as the magnitude of the angular velocity applied and the signal generated can be implemented with the same driving frequency output from the common driving circuit.

The present embodiment 3 assumes that the support beams 21, 22 and the support beams 23, 24 have the same spring constant k and the movable parts 1A and 2A have the same weight, and so the natural frequencies $\omega r1$ and $\omega r2$ of the two vibration systems are the same. However, strictly speaking, it seems difficult to realize two angular velocity detection units having the exactly same natural frequency because of variations or the like during manufacturing. Note that if two natural frequencies are close to each other in a certain range, variations of performance can be ignored, or the gain adjustment units 74 and 75 described in Embodiment 2 may be provided to correct the variations during manufacturing.

In the present Embodiment 3, the angular velocity detection units SC1 and SC2 are formed on one supporting substrate 3, and as described in Embodiment 2, they may be divided into two chips for configuration. Orientations only of the two chips may be differentiated during mounting, whereby angular velocity information on different detection axes can be obtained. When they are disposed in the same orientation, angular velocity information on the corresponding detection axis having a different detection range can be obtained as well.

That is the specific descriptions on the present invention made by the inventors by way of the embodiments. However, it is needless to say that the present invention is not limited to the foregoing embodiments and various modifications and alterations can be made within the scope of the present invention.

The above Embodiments 1 to 3 describe, as specific examples, the case to detect skidding and rollover of a vehicle for the purpose of descriptions. The present invention is not limited to such usage. For instance, the present invention can be widely used in the field of sensors for sensing attitudes of robots, car navigation, stabilizing digital camera images, sensing attitudes and directions in navigation systems, and sensing attitudes in video game systems. Especially, the sensor is expected to exert its outstanding performance when used for the necessity to detect a plurality of detection axes or angular velocities of a plurality of detection ranges.

The above Embodiments 1 to 3 describe the example including two angular velocity detection units, and the idea of the present invention is applicable to the configuration including three or more angular velocity detection units as well. For instance, when three angular velocity detection units each having a different detection range are provided, the method described in each embodiment can be used so that the angular velocity detection unit having the narrowest detection range among them has a maximum driving amplitude.

REFERENCE SIGNS LIST

SA: angular velocity sensor, SB: angular velocity sensor, SA1 to SA2: angular velocity detection unit, SB1 to SB2: angular velocity detection unit, SP1: space, SW1 to SW3: switch, CD1 to CD4: driving electrode, CM1 to CM4: monitor electrode (driving amplitude monitor electrode), CE1 to CE4: detection electrode, Vc: carrier wave (carrier signal), 1A: movable part, 1B: movable part, 2A: movable part, 2B: movable part, 3: supporting substrate, 3a: silicon substrate, 3b: thermally-oxidized film, 3c: thermally-oxidized film, 3d: space, 4: device layer, 5: intermediate insulation layer, 6: handle layer, 7 to 8: secured part, 9 to 10: common electrode, 11 to 12: secured part, 16: dummy part, 21 to 24: support beam, 25: insulation film, 25a: groove, 26 to 29: detection beam, 50: IC, 51: AFC, 52: AGC, 53: CV conversion unit, 54: differential detection unit, 55: AD conversion unit, 56: synchronized detection unit, 57: CV conversion unit, 58: differential detection unit, 59: AD conversion unit, 60: synchronized detection unit, 61: CV conversion unit, 62: differential detection unit, 63: AD conversion unit, 64: synchronized detection unit, 65: CV conversion unit, 66: differential detection unit, 67: AD conversion unit, 68: synchronized detection unit, 69: gain adjustment unit, 70: self diagnosis unit, 71 to 72: LPF (low-pass filter), 73: DA conversion part, 74 to 75: gain adjustment unit, 100: cap, 100a: silicon substrate, 100b to 100c: thermally-oxidized film, 100d: space, 100e: thermally-oxidized film, 150: package, 151: adhesive, 152: wire, 153: lid, 154: external input/output terminal

The invention claimed is:

1. An angular velocity sensor comprising:
a plurality of angular velocity detection units that detect angular velocity;
a driving circuit that drives the plurality of angular velocity detection units with a driving signal at a same frequency; and
a detection circuit that outputs a detection result of each of the angular velocity detection units, wherein
each of the angular velocity detection units is configured to have a different driving amplitude respectively when being driven by the driving signal,
the detection circuit outputs the detection result of each of the angular velocity detection units that corresponds to each of the driving amplitudes,
each of the angular velocity detection units includes a driving vibration system that vibrates with the driving amplitude by the driving signal,
each of the driving vibration systems included in each of the angular velocity detection units are configured to have a unique amplitude so as to not share vibration energy with the rest of the driving vibration systems, each of the driving vibration system included in each of the angular velocity detection units has a different natural frequency, thus each having a different driving amplitude when being driven by the driving signal, each of the angular velocity detection units has a different detection range, and the driving circuit makes the driving frequency follow the natural frequency of the driving vibration system included in the angular velocity detection unit having a narrowest detection range among the angular velocity detection units.

2. The angular velocity sensor according to claim 1, wherein
each of the angular velocity detection units is configured so that the respective Coriolis forces generated by each of the units are equal.

3. The angular velocity sensor according to claim 1, wherein
each of the angular velocity detection units includes a detection vibration system that outputs a detection signal corresponding to the detected angular velocity, the detection circuit processes the detection signal and outputs the processed signal as the detection result, and the angular velocity detection units share the detection circuit in a time-division manner.

4. The angular velocity sensor according to claim 1, wherein
the driving circuit drives each of the angular velocity detection units with respective driving signals having respectively different amplitude values.

5. The angular velocity sensor according to claim 4, wherein
each of the angular velocity detection units has a different detection range, and the driving circuit drives the angular velocity detection unit having a narrowest detection range by the driving signal having a largest signal level.

6. The angular velocity sensor according to claim 1, wherein
each of the angular velocity detection units is configured to have a different capacitance value defined by a driving electrode that is driven by the driving signal, thus having a different driving amplitude when being driven by the driving signal.

7. The angular velocity sensor according to claim 6, wherein
each of the angular velocity detection units are configured to have respectively different areas so as to have respectively different capacitance values.

8. The angular velocity sensor according to claim 6, wherein
each of the angular velocity detection units are configured to have respectively different distances between their respective driving electrodes and the points opposing the respective electrodes so as to have respectively different capacitance values.

9. The angular velocity sensor according to claim 1, wherein
each of the angular velocity detection units has a different detection axis.

* * * * *